United States Patent
Zhao et al.

(10) Patent No.: US 9,298,633 B1
(45) Date of Patent: Mar. 29, 2016

(54) ADAPTIVE PREFECTH FOR PREDICTED WRITE REQUESTS

(71) Applicant: EMC Corporation, Hopkinton, MA (US)

(72) Inventors: Junping Zhao, Beijing (CN); Ivan Basov, Brookline, MA (US)

(73) Assignee: EMC CORPORATION, Hopkinton, MA (US)

( * ) Notice: Subject to any disclaimer, the term of this patent is extended or adjusted under 35 U.S.C. 154(b) by 282 days.

(21) Appl. No.: 14/030,511

(22) Filed: Sep. 18, 2013

(51) Int. Cl.
*G06F 12/08* (2006.01)

(52) U.S. Cl.
CPC .................................. *G06F 12/0862* (2013.01)

(58) Field of Classification Search
None
See application file for complete search history.

(56) References Cited

U.S. PATENT DOCUMENTS

| | | | | |
|---|---|---|---|---|
| 5,903,911 A | * | 5/1999 | Gaskins | G06F 12/0862 711/133 |
| 2005/0210198 A1 | * | 9/2005 | Dimpsey | G06F 9/30181 711/137 |
| 2011/0055500 A1 | * | 3/2011 | Sasson | G06F 11/1451 711/162 |
| 2012/0173820 A1 | * | 7/2012 | Venkataramani | G06F 17/3048 711/124 |
| 2013/0246695 A1 | * | 9/2013 | Robertson | G06F 12/0862 711/103 |

* cited by examiner

*Primary Examiner* — Daniel Tsui
(74) *Attorney, Agent, or Firm* — Sean Evans; Jason A. Reyes; Krishnendu Gupta

(57) ABSTRACT

Implementations are provided herein relating to adaptive prefetch for predicted write requests. A set of I/O requests associated with a set of storage devices and a set of cache memory can be monitored. Through the application of a prefetch algorithm to the set of monitored I/O requests, future write requests can be predicted. Data blocks corresponding to the predicted future write requests can be read in parallel with other disk I/O and preloaded into cache for access by, for example, data protection processes. In this sense the efficiency of data protection processes can be enhanced by reducing sequential disk I/O requests.

20 Claims, 10 Drawing Sheets

ADAPTIVE PREFECTH FOR PREDICTED WRITE REQUESTS

FIELD OF THE INVENTION

This invention relates generally to processing data, and more particularly to systems and methods for protecting data.

BACKGROUND OF THE INVENTION

Computer systems not only store data to be accessed both locally and through a network but they are also capable of performing a wide variety of data protection technologies. Data protection technologies can include, for example, back-ups, mirroring, snapshots, etc. Providing local and network access to data blocks or data files along with employing a myriad of data protection technologies often correlates to a competition for computer system resources. For example, most storage devices are limited in the amount of reads and writes that can take place during any given time period. If after every write to a storage device, a second write is made to backup device, a third write is made to a mirror, and a fourth write is made to a snapshot storage device, performance of the system during these consecutive or parallel read/writes may suffer.

One way to increase performance and decrease competition for resources is to avoid unnecessary reads or writes by cataloging and/or indexing more information related to the storage and access of data. For example, in a snapshot system targeting Copy on First Write ("CoFW") data, a snapshot of the data is taken at the time the data is first updated, e.g., storing the original data in the CoFW snapshot and then updating the original data in its resident storage device. Thus, when a processor of the computer system receives an instruction to modify the original data block of the particular storage volume (e.g., a write instruction, a read-modify-write instruction, etc.), the processor allocates memory and then reads the original data block of the storage volume from disk into the allocated memory. However, reading the original data block from disk may take place even if the original data block already resides in the buffer cache of the computer system due to an earlier Input/Output ("I/O") request.

It is understood that by identifying data blocks that already reside in cache memory as data blocks necessary for performing data protection processes, the data blocks already residing in the buffer cache can be read and used in writing the data blocks to a snapshot storage device, a mirroring storage device, a backup storage device, etc, without performing a disk I/O. This can increase the efficiency of these data protection processes by reducing disk I/O. However, one limitation is that data blocks necessary to perform the data protection processes may not always reside in the buffer cache. Thus, there exists a need to identify data blocks that are necessary to perform the data protection processes and place them in the buffer cache, for later or concurrent access by data protection processes, without increasing sequential disk I/O.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a monitoring component can monitor a set of input/output ("I/O") requests associated with a set of cache memory and a set of storage devices. A predictive prefetch component can predict a future write request based on the set of I/O requests and a prefetch algorithm, wherein the future write request is associated with a first set of data blocks within the set of storage devices. An advanced reading component can, based on a prefetch status associated with the first set of data blocks, in response to an I/O request associated with a second set of data blocks within the set of storage devices, in parallel, perform the I/O request and write the first set of data blocks to the set of cache memory from the set of storage devices.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
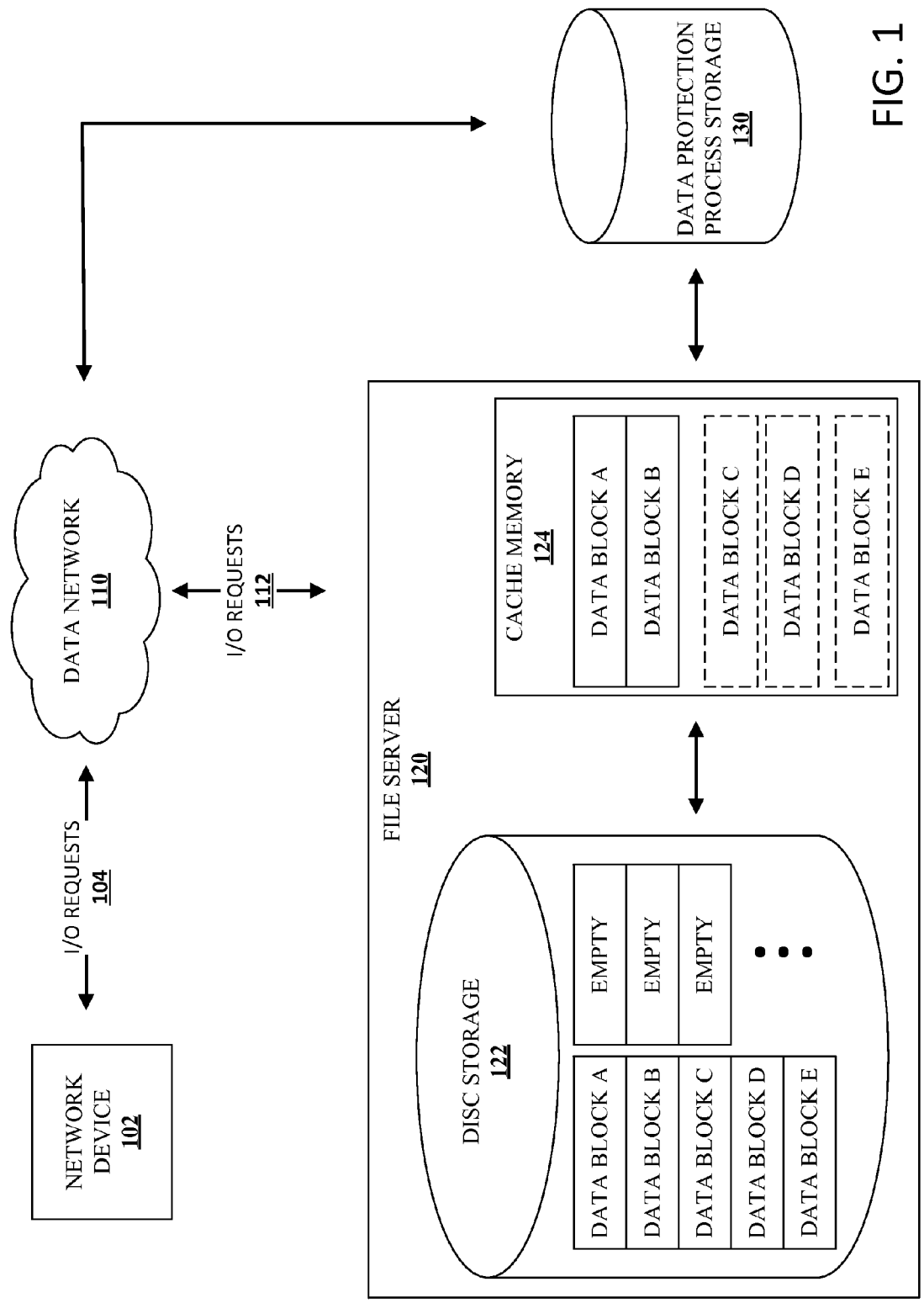
FIG. 1 illustrates an example block diagram, including an example data exchange in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

In a snapshot system targeting Copy on First Write ("CoFW") data, a snapshot of the data is taken at the time the data is first updated, e.g., storing the original data in the CoFW snapshot and then updating the original data in its resident storage device. Thus, when a processor of the computer system receives an instruction to modify the original data block of the particular storage volume (e.g., a write instruction, a read-modify-write instruction, etc.), the processor allocates memory and then reads the original data block of the storage volume from disk into the allocated memory. However, reading the original data block from disk may take place even if the original data block already resides in the buffer cache of the computer system due to an earlier Input/Output ("I/O") request.

It is understood that by identifying data blocks that already reside in cache memory as data blocks necessary for performing data protection processes, like CoFW, the data blocks already residing in the cache memory can be read and used in writing the data blocks to a snapshot storage device, a mirroring storage device, a backup storage device, etc, without performing a sequential disk I/O. To that end, implementations as described in "Handling Copy on First Write Data for Snapshot Purposes" U.S. patent application Ser. No. 13/530,503 are incorporated herein by reference. This can increase the efficiency of these data protection processes by reducing disk I/O. However, one limitation of the referenced implementations is that data blocks necessary to perform the data protection processes may not always reside in the cache memory. Thus, there exists a need to identify data blocks that are necessary to perform data protection processes or other processes and place them in the cache memory, for later or concurrent access by data protection processes, without increasing disk I/O.

Implementations disclosed herein provide for improving the performance and efficiency of data protection processes and storage processes. To that end, it is desirable to avoid unnecessary reads or writes by cataloging and/or indexing more information related to the storage and access and data. For example, Input/Output ("I/O") requests related to network servers, storage devices, etc., can be monitored. While monitoring I/O requests, prefetch algorithms can be used to predict sets of data blocks within associated storage devices that will be read from or written to in the future. In identifying sets of data blocks to be read from or written to in the future, concurrent I/O implementations, as further described in "Managing Concurrent I/Os in File Systems" U.S. patent application Ser. No. 13/247,753, and incorporated herein by reference, can be used to preload data blocks or sets of data blocks into the cache memory from a storage device concurrently with an unrelated already scheduled I/O on the same storage device. In this respect, a sequential disc I/O is avoided as concurrent and in parallel with the already scheduled I/O, the cache memory is loaded with a data block or a set of data blocks identified by the prefetch algorithm. If the prefetch algorithm correctly identifies data blocks or sets of data blocks, then the data is already preloaded in the cache memory and available for use by a snapshot system, backup system, COFW snapshot system, etc.

Referring now to FIG. 1, there is illustrated a block diagram of an example data exchange. Network device 102 can be a laptop computer, a desktop computer, a tablet, a smart phone, etc. Network device can place I/O requests 104 with data network 110 to access a file, a set of data blocks, a data access permission, etc. Data network 110 can be communicatively coupled with File Server 120. Data Network 110 can determine a subset of I/O requests 104 to forward to File Server 120 as I/O requests 112. It can be appreciated that another subset of I/O Requests 104 can be targeted to other file servers (not depicted), storage devices (for example data protection process storage 130), client devices (not depicted), etc. and can be routed to the appropriate device through Data Network 110.

A system, not depicted, and as more fully described with respect to FIGS. 2-5, can reside within or be communicatively coupled to Data Network 110 or File Server 120. The system can monitor I/O Requests 104 and 112, and through the application of a prefetch algorithm, along with the monitored data, determine potential future write requests or read requests. For example, one prefetch algorithm can be based of sequential access of data blocks. Through monitoring I/O Requests 112, it can be determined that Network Device 102 is making sequential requests to access sequential ranges of a data within file system. Continuing the example, sequential File Server 120 Disc Storage 122 ranges Data Block A, Data Block B, Data Block C, Data Block D, and Data Block E correspond to sequential ranges of offsets within the logical layout of the file system of Disc Storage 122.

Through monitoring I/O requests, it can be determined that Data Block A and Data Block B have been sequentially accessed for write requests. The prefetch algorithm then determines that offset ranges associated with Data Block C, Data Block D, and Data Block E are likely to be accessed next for write requests.

When an unrelated read or write request is then received for an offset range outside Data Blocks A-E, at the time the unrelated request is performed, in parallel, data can be prefetched, e.g., read, from offset ranges for Data Blocks C-E and written to cache memory concurrently with executing the unrelated read or write request. After which, original data from Data Block C, Data Block D and Data Block E from the file system reside in cache memory to be processed by a snapshot storage system, processed by a mirrored storage system, or processed by any data protection process without requiring separate sequential read I/O from the file system. For example, Data Block C could be processed by a data protection process, e.g., a snapshot storage process, and sent to Data Protection Process Storage 130 either directly or through Data Network 110.

It can be appreciated that data blocks can be prefetched piecemeal rather than in bulk as described in the preceding example. For example, after receiving I/O requests related to Data Block A and Data Block B, data Block D can be prefetched and loaded into Cache Memory 124 at the time Data Block C is requested as an I/O request by Network Device 102. If Data Block D is then accessed via cache, Data Block E can be prefetched into Cache Memory 124 when performing an unrelated I/O, etc.

It can be also appreciated that prefetch algorithms are not exclusive to sequential writes and can also be established to predict other disc activity. For example, reads can also be predicted. In addition, writes or reads need not be sequential for the prefetch algorithm to correctly predict a future write request or future read request. A pattern of reads or writes can be identified which predicts a future read or write based on the pattern continuing. In some implementations, the pattern is not based on sequential offsets within a storage device, such as Disc Storage 122 as shown in FIG. 1. In one example, through a process of machine learning, prefetch algorithms can be refined for accuracy based on identifying previously requested or performed disc access patterns.

It can be further appreciated that the prefetch algorithm may not always accurately predict future disc activity. When the prefetch algorithm is accurate in predicting a future write, in accordance with implementations of this disclosure, original data from the write address will already be stored within cache for access by a data protection process. It can be further appreciated that in the event the prefetch algorithm is inaccurate, the cache memory that stores the data related to a range where a subsequent write request is not received can be flushed from cache memory.

Figure 2:
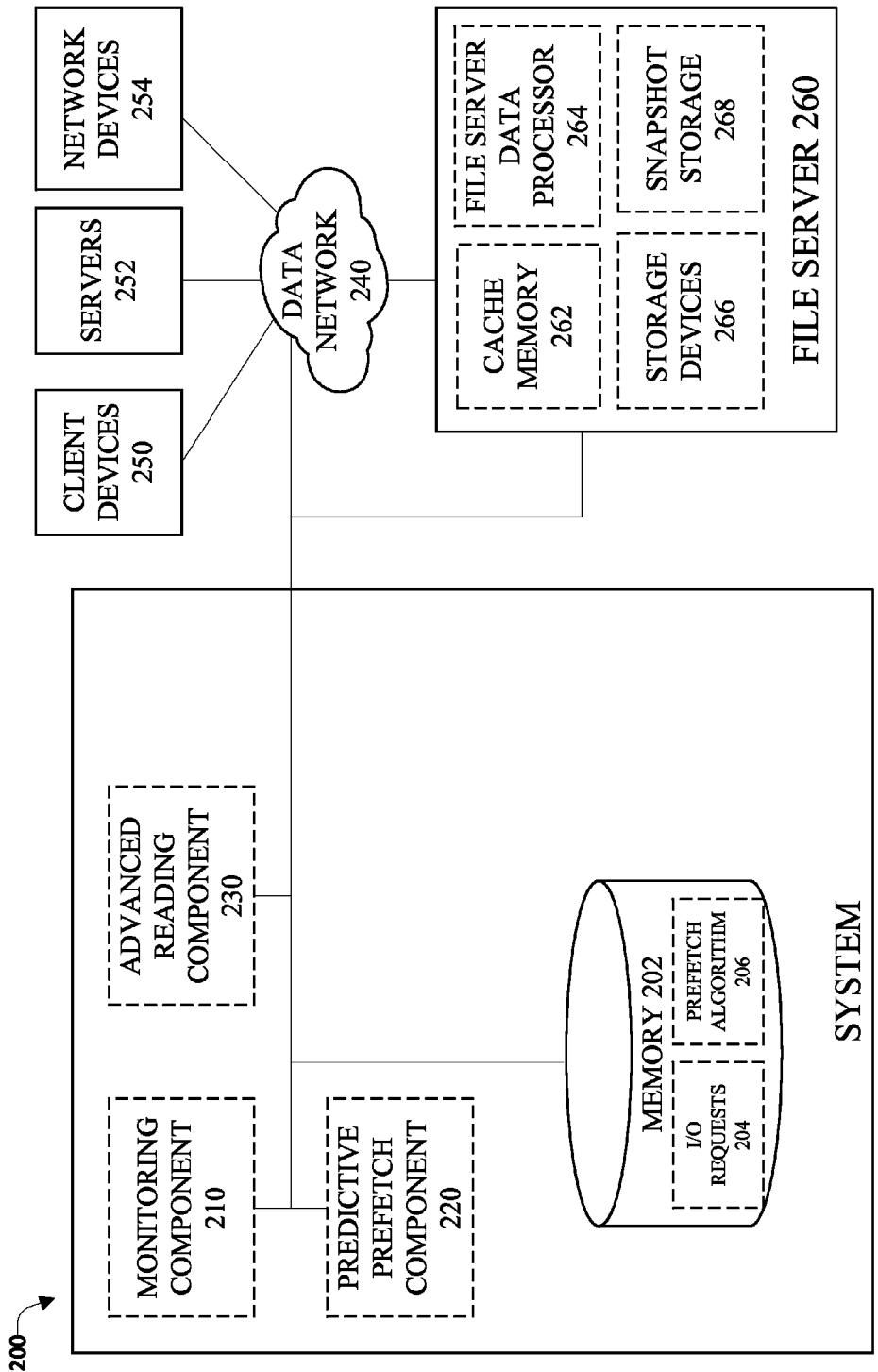
FIG. 2 illustrates a high-level functional block diagram of an example system in accordance with implementations of this disclosure.

Referring now to FIG. 2, there is illustrated a high-level functional block diagram of an example system in accordance with implementations of this disclosure. System 200 includes a monitoring component 210, a predictive prefetch component 220, an advanced reading component 230, and a memory 20 communicatively coupled to Data Network 240 or individual servers, for example, File Server 260. It can be appreciated that through Data Network 240 or through direct connection, System 200 can communicate with Client Devices 250, Server 252, or Network Devices 254. Client Devices 250 can include laptop computers, desktop computers, tablets, smart phones, e-readers, etc. Servers 252 can include storage servers, backup servers, data protection process servers, web servers, etc. Network Devices 254 can include printers, storage devices, network access points, network infrastructure, etc. In one implementation, System 200 can reside within Data Network 240 and act as a network element capable of interacting and exchanging data with any device or server attached or communicatively coupled with Data Network 240. System 200 can also reside within File Server 260, e.g., as a part of a storage controller. It can be appreciated that System 200 can include a processor capable of executing computer executable components. In one implementation, processors attached to File Server 260, e.g., file server data processor 264, or Data Network 240 can be capable of executing computer executable components within System 200.

Monitoring component 210 can monitor a set of I/O requests associated with a set of cache memory 262 and a set of storage devices 266. In the depicted example, File Server 260 includes Cache Memory 262 and Storage Devices 266. It can be appreciated that monitoring component 210 can monitor I/O requests associated with cache memory and storage devices outside of File Server 260 concurrently with monitoring File Server 260. In one implementation, monitoring component 210 can dynamically monitor the set of I/O requests. In one implementation, monitored I/O requests 204 can be stored within Memory 202 for access by other components.

In one implementation, the set of I/O requests can include associated metadata. For example, metadata associated with a write request can include file information such as a file name, a snapshot status, a first write status, a backup status, a timestamp, a date stamp, a file type, a last update time, a version, etc. It can be appreciated that metadata related to data protection processes can be present within the metadata associated with the set of I/O requests and that the metadata can contain instructions related to a data protection process providing how or where a file or a group of data blocks are to be processed.

In one implementation, metadata associated with I/O requests in the set of I/O requests includes at least one of a storage device location, a data block location, a file system location, or a timestamp. For example, if System 200 was located within Data Network 240 and was monitoring a set of I/O requests associated with a large amount of storage devices, sets of I/O requests can be grouped or sorted based on those that share a common storage location, a common data block location, a common file system location, etc.

Predictive prefetch component 220 can predict a future write request based on the set of I/O requests and a prefetch algorithm, wherein the future write request is associated with a first set of data blocks within the set of storage devices. In some implementations, predictive prefetch component 220 can predict a future read request based on the set of I/O requests and a prefetch algorithm. It can be appreciated that the prefetch algorithm can be adjusted to predict read requests, write requests, or read and write requests.

In one implementation, the prefetch algorithm can be a learning algorithm that learns from past accurate and inaccurate predictions to make more accurate future predictions. It can be appreciated that the prefetch algorithm can identify varying patterns of disc access concurrently. For example, the prefetch algorithm can process I/O request data and predict sequential reads or writes along with patterned reads or writes outside of a sequential order. It can be appreciated that prefetch algorithm 206 can be stored within memory 202 for access by components.

In one implementation, predictive prefetch component 220 dynamically predicts future write requests. For example, as monitoring component 210 dynamically monitors I/O requests, predictive prefetch component 220 can dynamically predict future requests based on the dynamic monitoring of the I/O requests.

Advanced reading component 230 can, based on a prefetch status associated with the first set of data blocks, in response to an I/O request associated with a second set of data blocks within the set of storage devices, in parallel, perform the I/O request and write the first set of data blocks to the set of cache memory 262 from the set of storage devices 266. It can be appreciated that advanced reading component 230 can work separate from or in conjunction with a storage controller or a file server data processor to perform disc I/O. For example, in one implementation, advanced reading component 230 performs the I/O request and writes the first set of data blocks to the set of cache memory by instructing a storage controller, e.g., File Server Data Processor 264, to perform the operations within a cached disk array.

In one implementation, the prefetch status can inform system 200 regarding whether the first set of data blocks are necessary for a data protection process. For example, if the prefetch status indicates that the first set of data blocks are necessary for COFW snapshot storage, advanced reading component 230 will retrieve the data and place it within the set of cache memory 262. In another example, if the prefetch status indicates the first set of data blocks are necessary for a mirror assembly; advanced reading component 230 will retrieve the data and place it within the set of cache memory.

Figure 3:
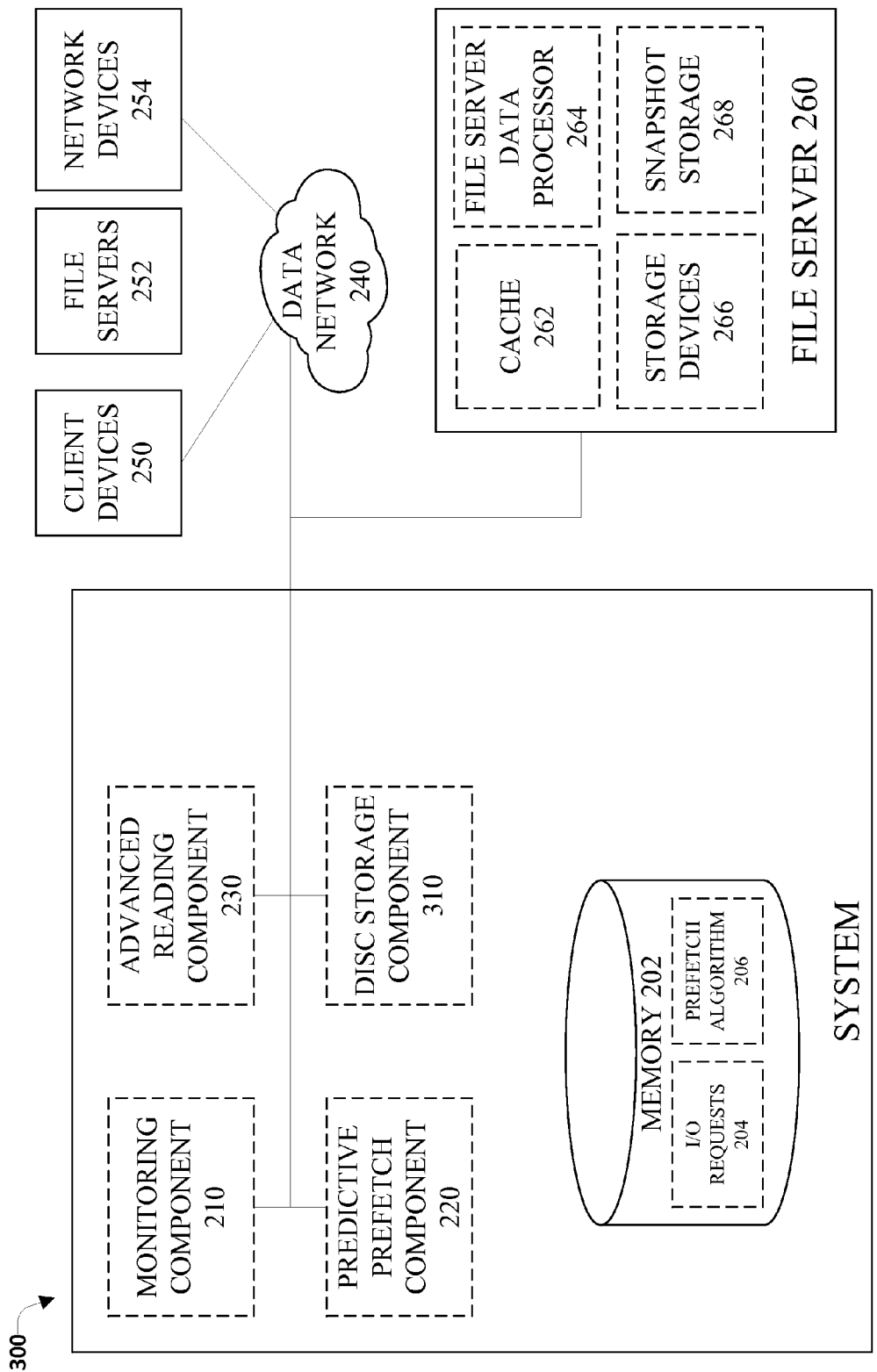
FIG. 3 illustrates a high-level functional block diagram of an example system including a disc storage component in accordance with implementations of this disclosure.

Referring now to FIG. 3, there is illustrated a high-level functional block diagram of an example system including a disc storage component 310 in accordance with implementations of this disclosure. Disc storage component 310 can read the first set of data blocks from the set of cache memory and write the first set of data blocks to a second storage device separate from the set of storage devices. For example, disc storage component 310 can send the prefetched data residing within the set of cache memory to a storage device outside of file server 260, such as a mirror assembly or backup storage device. It can be appreciated that disc storage component 310 can essentially route data prefetched from File Server 260 to any place within or communicatively coupled to data network 240. For example, when prefetching read data, original read data present within cache, e.g., prefetched read data before being written over by any subsequent writes, can be sent for storage to a data storage location by disc storage component 310.

In one implementation, disc storage component 310 can read metadata associated with the first set of data blocks and can write the first set of data blocks to a second storage device based on the metadata. For example, metadata can be associated with the first set of data blocks that inform system 300 of a user, a user directed process, an automated process, etc. is directing that the data be sent to a location within or communicatively coupled to data network 240.

In one implementation, disc storage component 310 can determine whether data sets that are prefetched are later modified by an I/O request making them ripe for a data protection processes. Disc storage component 310 can then write the first set of data blocks to a second storage device based on the determination. For example, for a backup assembly, if a prefetched read request within cache memory is determined to have been subsequently written over within storage device 266, the original prefetched read data within cache memory can be ripe for storage within a backup storage device as version data.

Figure 4:
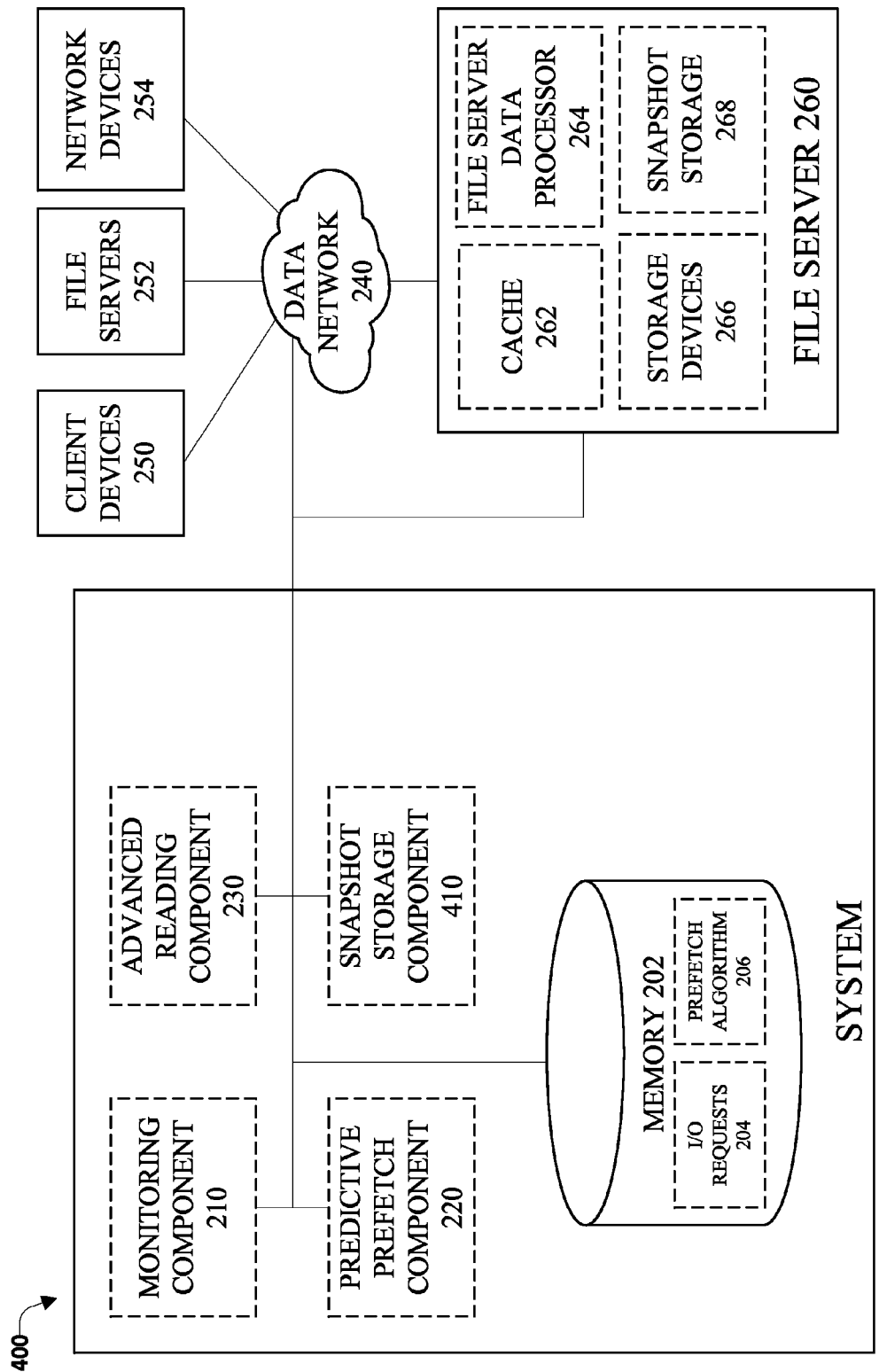
FIG. 4 illustrates a high-level functional block diagram of an example system including a snapshot storage component in accordance with implementations of this disclosure.

Referring now to FIG. 4, there is illustrated a high-level functional block diagram of an example system including a snapshot storage component 410 in accordance with implementations of this disclosure. Snapshot storage component 410 can, in response to the advanced reading component 230 writing the first set of data blocks to the set of cache memory, send the first set of data blocks to a snapshot storage system. In one implementation, metadata associated with the first set of data blocks can identity whether the first set of data blocks are appropriate for snapshot storage. For example, for COFW, if a predicted write request has place original data with cache memory, and that original data is associated with a first write, snapshot storage component 410 can send the first set of data blocks to a snapshot storage system.

In one implementation, snapshot storage component 410 can determine whether data sets that are prefetched are later modified by an I/O request making them ripe for a COFW snapshot or other data protection processes. Snapshot storage component 410 can then send the first set of data blocks to a snapshot storage system further based on determination.

Figure 5:
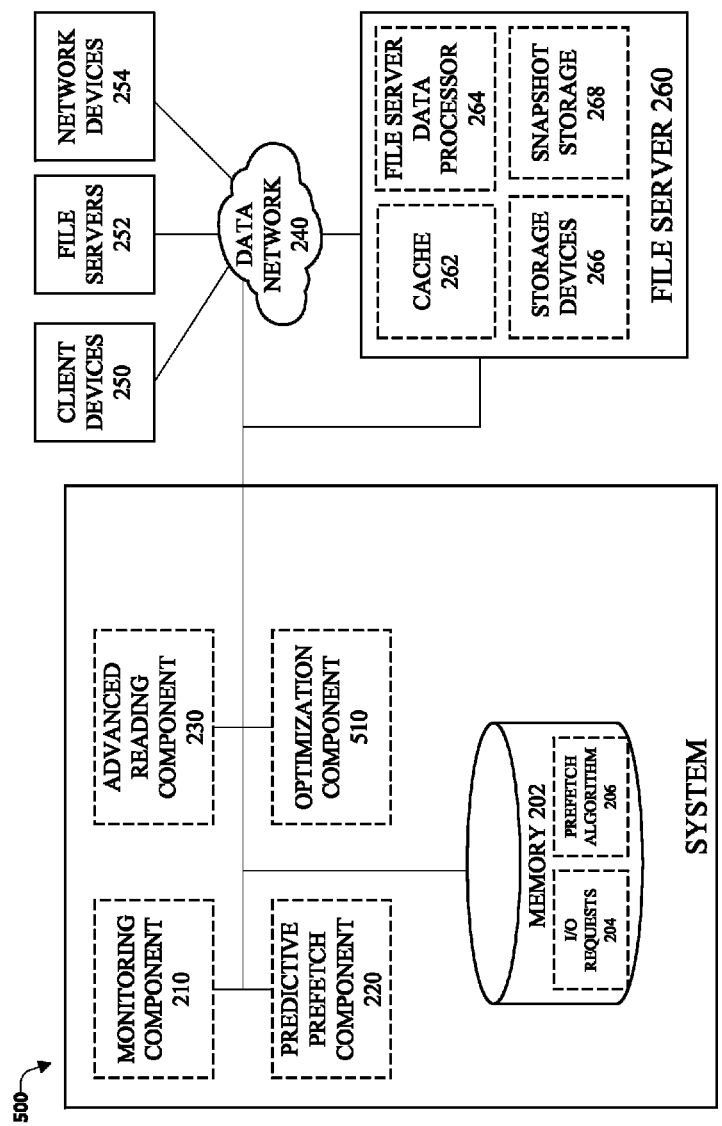
FIG. 5 illustrates a high-level functional block diagram of an example system including an optimization component in accordance with implementations of this disclosure.

Referring now to FIG. 5, there is illustrated a high-level functional block diagram of an example system including an optimization component 510 in accordance with implementations of this disclosure. Optimization component 510 can determine the prefetch status based on metadata associated with the first set of data blocks. For example, metadata associated with the first set of data blocks can identify the first set of data blocks as a first write, ripe for a COFW snapshot when being written over. In another example, metadata associated with the first set of data blocks can identify the first set of data blocks necessary for mirroring, backup, or other data protection processes.

In one implementation, optimization component 510 can determine whether predictive prefetch component is making accurate or inaccurate predictions, and along with I/O requests 204, refine prefetch algorithm 206 based on past performance to increase the accuracy of prefetch algorithm 206.

FIGS. 6-9 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 6:
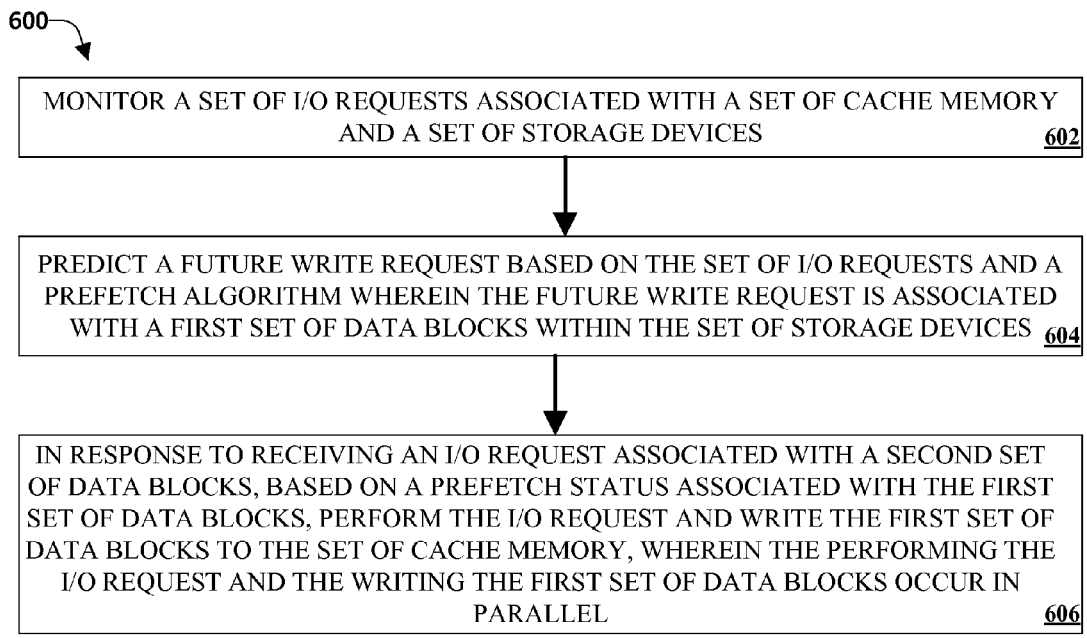
FIG. 6 illustrates an example method for reading and writing a data set in parallel based on a predicted write request in accordance with implementations of this disclosure.

FIG. 6 illustrates an example method for reading and writing a data set in parallel based on a predicted write request in accordance with implementations of this disclosure. At 602, a set of I/O associated with a set of cache memory and a set of storage devices can be monitored (e.g., by a monitoring component 210). In one implementation, the monitoring the set of I/O requests is dynamic. In one implementation, the set of I/O requests includes associated metadata. In one implementation, metadata associated with I/O requests in the set of I/O requests includes at least one of a storage device location, a data block location, a file system location, or a timestamp. At 604, a future write request can be predicted (e.g., by a predictive prefetch component 220) based on the set of I/O requests and a prefetch algorithm wherein the future write request is associated with a first set of data blocks within the set of storage devices. In one implementation, the predicting the future write request is dynamic. At 606, in response to receiving an I/O request associated with a second set of data blocks, based on a prefetch status associated with the first set of data blocks, perform (e.g., by an advanced reading component 230) the I/O request and write (e.g., by an advanced reading component 230) the first set of data blocks to the set of cache memory, wherein the performing the I/O request and the writing the first set of data blocks occur in parallel.

Figure 7:
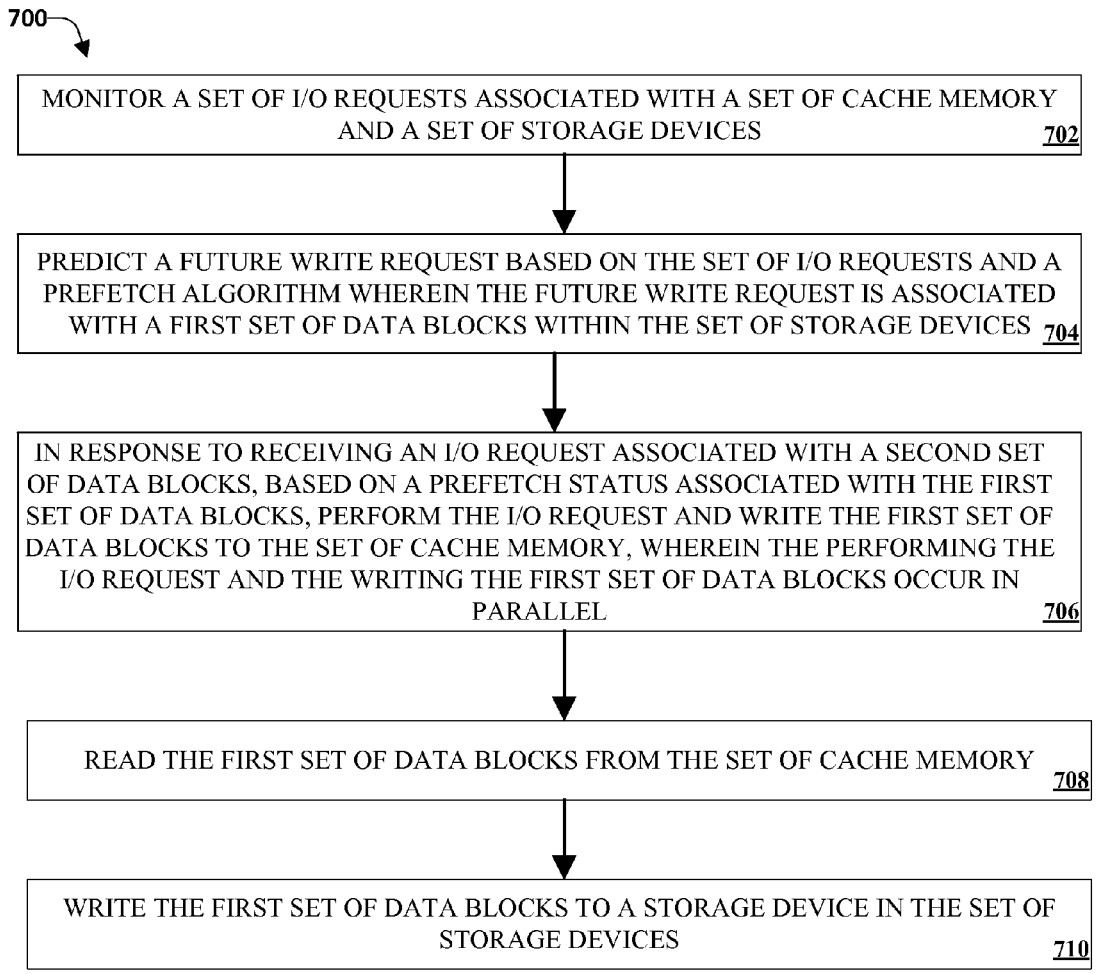
FIG. 7 illustrates an example method for reading and writing a data set in parallel based on a predicted write request including a second read of a dataset from cache memory and storing the data set in a storage device in accordance with implementations of this disclosure.

FIG. 7 illustrates an example method for reading and writing a data set in parallel based on a predicted write request including a second read of a dataset from cache memory and storing the data set in a storage device in accordance with implementations of this disclosure. At 702, a set of I/O associated with a set of cache memory and a set of storage devices can be monitored (e.g., by a monitoring component 210). At 704, a future write request can be predicted (e.g., by a predictive prefetch component 220) based on the set of I/O requests and a prefetch algorithm wherein the future write request is associated with a first set of data blocks within the set of storage devices. At 706, in response to receiving an I/O request associated with a second set of data blocks, based on a prefetch status associated with the first set of data blocks, perform (e.g., by an advanced reading component 230) the I/O request and write (e.g., by an advanced reading component 230) the first set of data blocks to the set of cache memory, wherein the performing the I/O request and the writing the first set of data blocks occur in parallel.

Figure 8:
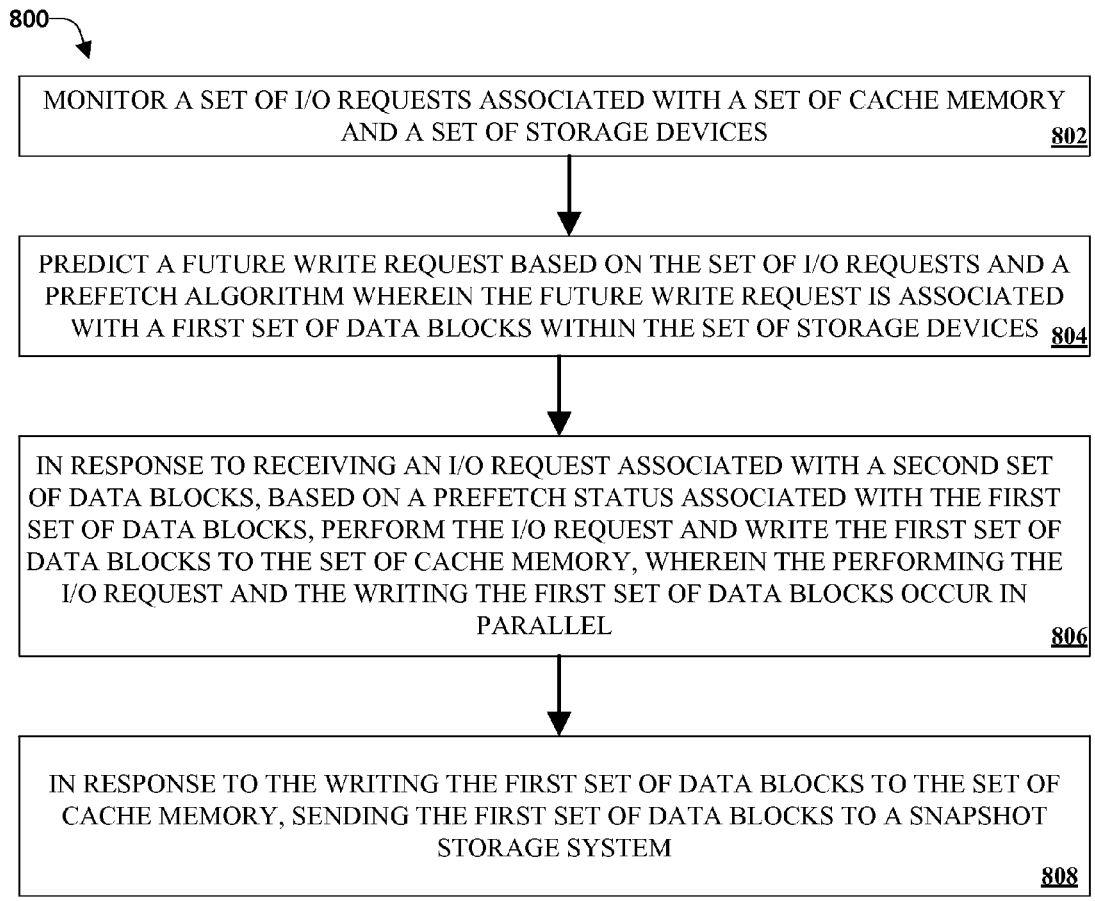
FIG. 8 illustrates an example method for reading and writing a data set in parallel based on a predicted write request including further processing video channel data in accordance with implementations of this disclosure.

FIG. 8 illustrates an example method for reading and writing a data set in parallel based on a predicted write request including further processing video channel data in accordance with implementations of this disclosure. At 802, a set of I/O associated with a set of cache memory and a set of storage devices can be monitored (e.g., by a monitoring component 210). At 804, a future write request can be predicted (e.g., by a predictive prefetch component 220) based on the set of I/O requests and a prefetch algorithm wherein the future write request is associated with a first set of data blocks within the set of storage devices. At 806, in response to receiving an I/O request associated with a second set of data blocks, based on a prefetch status associated with the first set of data blocks, perform (e.g., by an advanced reading component 230) the I/O request and write (e.g., by an advanced reading component 230) the first set of data blocks to the set of cache memory, wherein the performing the I/O request and the writing the first set of data blocks occur in parallel.

Figure 9:
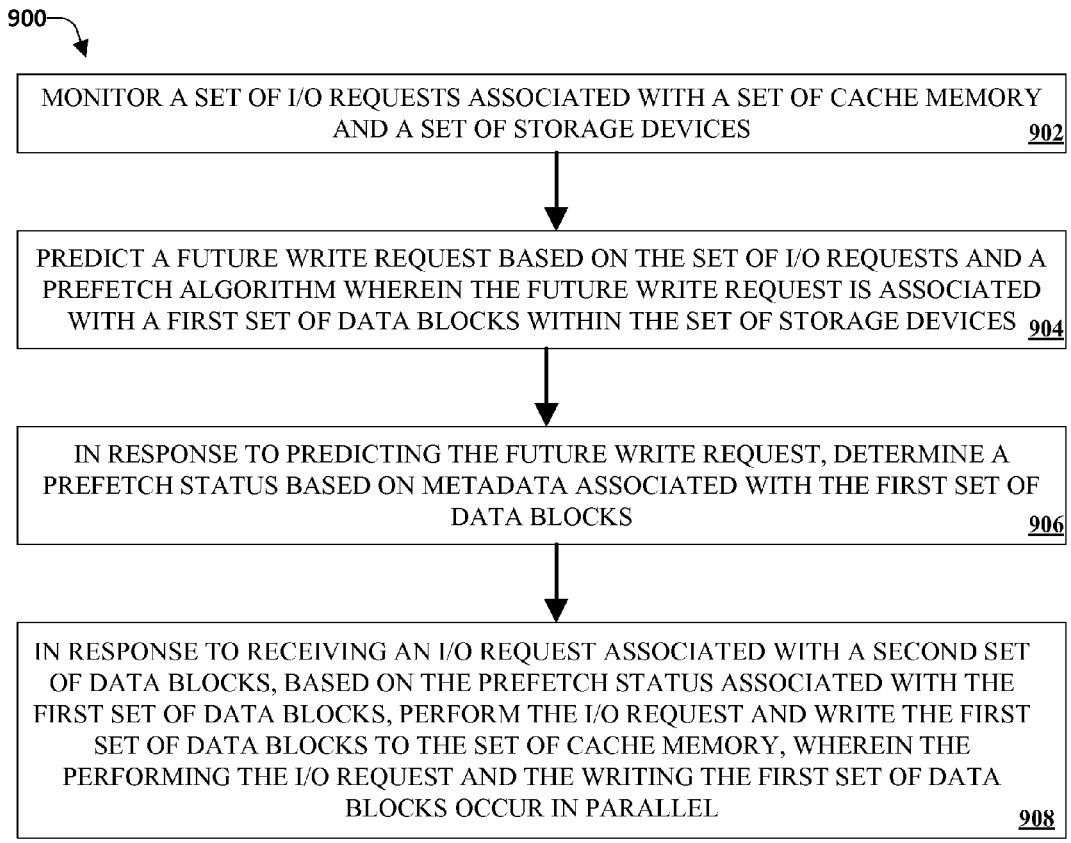
FIG. 9 illustrates an example method for reading and writing a data set in parallel based on a predicted write request including generating weighted audio and video min-hashes in accordance with implementations of this disclosure.

FIG. 9 illustrates an example method for reading and writing a data set in parallel based on a predicted write request including generating weighted audio and video min-hashes in accordance with implementations of this disclosure. At 902, a set of I/O associated with a set of cache memory and a set of storage devices can be monitored (e.g., by a monitoring component 210). At 904, a future write request can be predicted (e.g., by a predictive prefetch component 220) based on the set of I/O requests and a prefetch algorithm wherein the future write request is associated with a first set of data blocks within the set of storage devices.

At 908, in response to receiving an I/O request associated with a second set of data blocks, based on a prefetch status associated with the first set of data blocks, perform (e.g., by an advanced reading component 230) the I/O request and write (e.g., by an advanced reading component 230) the first set of data blocks to the set of cache memory, wherein the performing the I/O request and the writing the first set of data blocks occur in parallel.

Figure 10:
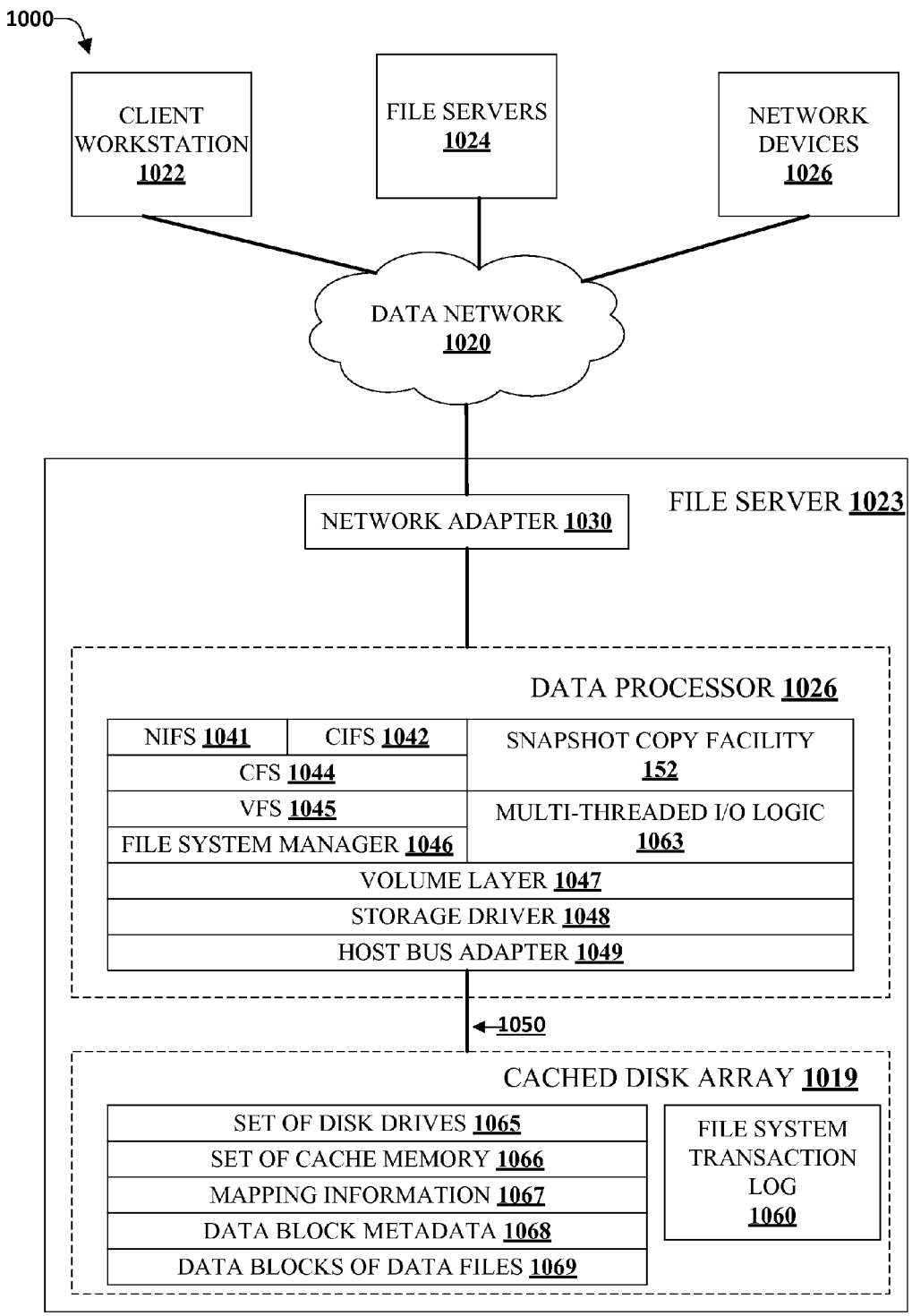
FIG. 10 illustrates an example block diagram representing a networked file server in accordance with implementations of this disclosure.

Referring now to FIG. 10, there is illustrated an example block diagram representing a file server, a data network, and associated network devices in accordance with implementations of this disclosure. The data storage system 1000 includes a data network 1020 interconnecting client workstation 1022, file servers 1024, network devices 1026 and a data storage system such as a network file server 1023 (also referred to simply as "file server"). The data network 1020 may include any one or more of network connection technologies, such as Ethernet, and communication protocols, such as TCP/IP. The client workstations, 1022 for example, are workstations such as personal computers. The workstations are generally operated by users. File servers 1024 can resemble file server 1023 but may have different component or different functionality depending on the purpose of the individual file server. Network devices 1026 can include printers, desktop computers, laptop computers, tablets, e-readers, security cameras, electronic sensors, etc. Client workstations 1022, file servers 1024, and network devices 1026 may access the network file server 1023, for example, in performing input/output (I/O) operations, data requests, and other operations.

Various aspects of the network file server 1023 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 1023 includes at least one data processor 1026 and a cached disk array 1019. The data processor 1026, for example, is a commodity computer. The cached disk array 1019 includes multiple disk drives 1065, a high-speed random-access cache memory 1066, a logical-to-physical mapping 1067 between the cache memory and the disk drives, data block metadata 1068, and data blocks of data files 1069 that may reside within the set of disk drives 1065 or on the set of cache memory 1066 or both.

The data processor 1026 has a network interface 1030 for communication of data packets over the data network 1020 via a data transmission protocol such as TCP/IP. The data processor 1026 is programmed with a Network File System (NFS) module 41 for supporting communication with network clients over the data network 1020 using the NFS file access protocol, and a Common Internet File System (CIFS) module 1042 for supporting communication with network clients over the data network using the CIFS file access protocol. The NFS module 1041, and the CIFS module 1042 are layered over a Common File System (CFS) module 1044, and the CFS module is layered over a Virtual File System (VFS) module 1045. The VFS module 1045 is layered over a Universal File System (UxFS) module. The UxFS module is a file system manager 1046 for managing a file system such as a UNIX-based file system. The CFS module 1044 provides higher-level functions common to NFS 1041 and CIFS 1042.

The file system manager 1046 accesses data organized into logical volumes defined by a logical volume layer module 1047. Each logical volume maps to contiguous logical storage addresses in the cached disk array 1019. The logical volume layer module 1047 is layered over a storage driver 1048 such as a Fibre-Channel (FC), a Small Computer System Interface (SCSI), and an Internet SCSI (iSCSI) driver. The data processor 1026 sends storage access requests through a host bus adapter 1049 using a storage protocol such as the FC, SCSI, or iSCSI used by the storage driver 1048, depending on the physical data link 1050 between the data processor 1026 and the cached disk array 1019.

The CFS module 1044, the VFS module 1045, the file system manager 1046, the logical volume layer 1047, and the storage driver 1048 are modules of an operating system program executing on file server 1023. The NFS module 1041 and CIFS module 1042 are internal application programs supported by the operating system. The data processor 1026 is programmed with additional internal application programs including a snapshot copy facility 1052.

The snapshot copy facility 1052 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 1020 may be any one or more of a variety of networks or other type of communication connections as known to those skilled in the art. For example, the data network 1020 may be the Internet, an intranet, network or other wireless or other hardwired connection(s) by which the client workstations 1022, file servers 1024, and network devices 1026 may access and communicate with the network file server 1023, and may also communicate with other components (not shown) that may be included in the network file server 1023. Each of client workstations 1022, file servers 1024, network devices 1026 and the network file server 1023 may be connected to the data network 1020 by any one of a variety of connections as may be provided and supported in accordance with the type of data network 1020.

The processors included in the client workstations 1022, file servers 1024, network devices 1026 and data processor 1026 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 1023 are described herein in more detail, and may vary with each particular implementation. Each of the client workstations 1022, file servers 1024, network devices 1026 and the network file server 23 may all be located at the same physical site, or, alternatively, may also be located in different physical locations. Some or all of the connections by which the client workstations 1022, file servers 1024, network devices 1026, and the network file server 1023 may be connected may pass through other communication devices, such as a Connectrix or other switching equipment that may exist such as a phone line, a repeater, a multiplexer or even a satellite.

Each of the client workstations 1022, file servers 1024, and network devices 1026 may perform different types of data operations in accordance with different types of tasks. Any one of the client workstations 1022, file servers 1024, and network devices 1026 may issue a data request to the network file server 1023 to perform a data operation. For example, an application executing on one of the client workstations 1022 may perform a read or write operation resulting in one or more data requests to the network file server 1023.

An implementation of the data storage system 1000 may include one or more network file servers 1024. Each of the network file servers 1024 may include one or more data storage devices, such as disks. Each of the network file servers 1024 included in data storage system 1000 may be interconnected. Additionally, the network file servers 1024 may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 1023.

It should be noted that each of the network file servers 1024, 1023, etc. may operate stand-alone, or may also be included as part of a storage area network (SAN) that includes, for example, other components such as other network file servers.

Each of the network file servers of element 1000 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Client workstations 1022, file servers 1024, and network devices 1026, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In an implementation in which element 1000 of FIG. 1 is implemented using one or more data storage systems, each of the data storage systems may include code thereon for performing the techniques as described herein. In following paragraphs, reference may be made to a particular implementation such as, for example, an implementation in which element 1000 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 1023 may also include other components than as described for purposes of illustrating the techniques herein.

As shown in the data storage system 1000 in FIG. 1, file systems typically include metadata 1068 describing attributes of a file system and data from a user of the file system. A file system contains a range of file system blocks that store metadata and data. In at least some embodiments of the current technique, the file system block may be 8 kilobytes (KB) in size. Further, a user or an automated program of data storage system 1000 can create files in the file system.

The data storage system 1000 also includes journal such as a file system transaction log 1060. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 1060 is later used to recover the file system when file server 1023 reboots due to a failure. Upon reboot of file server 1023, file system transaction log 1060 is inspected to find a last valid transaction recorded in the log 1060, and the last valid transaction is applied to the file system stored on a persistent storage for updating metadata of the file system by using metadata information stored in file system transaction log 1060. Further, in at least one implementation of the current technique, multi-threaded logic is used to enable data storage system 1000 perform concurrent I/O operations on a file of a file system.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
      a monitoring component that monitors a set of input/output ("I/O") requests associated with a set of cache memory and a set of storage devices;
      a predictive prefetch component that predicts a future write request based on the set of I/O requests and a prefetch algorithm, wherein the future write request is associated with a first set of data blocks within the set of storage devices; and
      an advanced reading component that based on a prefetch status associated with the first set of data blocks, in response to an I/O request associated with a second set of data blocks within the set of storage devices, in parallel, performs the I/O request and writes the first set of data blocks to the set of cache memory from the set of storage devices.

2. The system of claim 1, wherein the monitoring component dynamically monitors the set of I/O requests.

3. The system of claim 1, wherein the predictive prefetch component dynamically predicts the future write request.

4. The system of claim 1, wherein the set of I/O requests includes associated metadata.

5. The system of claim 4, wherein metadata associated with I/O requests in the set of I/O requests include at least one of a storage device location, a data block location, a file system location, or a timestamp.

6. The system of claim 1, further comprising:
   a disc storage component that reads the first set of data blocks from the set of cache memory and writes the first set of data blocks to a second storage device separate from the set of storage devices.

7. The system of claim 1, further comprising:
   a snapshot storage component that in response to the advanced reading component writing the first set of data blocks to the set of cache memory, sends the first set of data blocks to a snapshot storage system.

8. The system of claim 1, further comprising:
   an optimization component that determines the prefetch status based on metadata associated with the first set of data blocks.

9. The system of claim 7 wherein the snapshot storage system is separate from the cache memory and the set of storage devices.

10. A method comprising:
    monitoring a set of I/O requests associated with a set of cache memory and a set of storage devices;
    predicting a future write request based on the set of I/O requests and a prefetch algorithm wherein the future write request is associated with a first set of data blocks within the set of storage devices;
    in response to receiving an I/O request associated with a second set of data blocks, based on a prefetch status associated with the first set of data blocks, performing the I/O request and writing the first set of data blocks to the set of cache memory, wherein the performing the I/O request and the writing the first set of data blocks occur in parallel.

11. The method of claim 10, wherein the monitoring the set of I/O requests is dynamic.

12. The method of claim 11, wherein the predicting the future write request is dynamic.

13. The method of claim 10, wherein the set of I/O requests includes associated metadata.

14. The method of claim 13, wherein metadata associated with I/O requests in the set of I/O requests includes at least one of a storage device location, a data block location, a file system location, or a timestamp.

15. The method of claim 10, further comprising:
    reading the first set of data blocks from the set of cache memory; and
    writing the first set of data blocks to a storage device in the set of storage devices.

16. The method of claim 10, further comprising:
    in response to the writing the first set of data blocks to the set of cache memory, sending the first set of data blocks to a snapshot storage system.

17. The method of claim 10, further comprising:
    in response to predicting the future write request, determining the prefetch status based on metadata associated with the first set of data blocks.

18. A non-transitory computer readable medium with program instructions stored thereon to perform the following acts:
    monitoring a set of I/O requests associated with a set of cache memory and a set of storage devices;
    predicting a future write request based on the set of I/O requests and a prefetch algorithm wherein the future write request is associated with a first set of data blocks within the set of storage devices;
    in response to receiving an I/O request associated with a second set of data blocks, based on a prefetch status associated with the first set of data blocks, performing the I/O request and writing the first set of data blocks to the set of cache memory, wherein the performing the I/O request and the writing the first set of data blocks occur in parallel.

19. The non-transitory computer readable medium of claim 18, further comprising:
   in response to the writing the first set of data blocks to cache memory, sending the first set of data blocks to a snapshot storage system.

20. The non-transitory computer readable medium of claim 18, further comprising:
   in response to predicting the future write request, determining the prefetch status based on metadata associated with the first set of data blocks.

* * * * *